(12) United States Patent
Han et al.

(10) Patent No.: US 10,296,079 B2
(45) Date of Patent: May 21, 2019

(54) DISPLAY DEVICE AND ADJUSTMENT METHOD THEREOF

(71) Applicant: BOE TECHNOLOGY GROUP CO., LTD., Beijing (CN)

(72) Inventors: Yang Han, Beijing (CN); Xiangyan Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/521,901

(22) PCT Filed: Sep. 30, 2016

(86) PCT No.: PCT/CN2016/100973
§ 371 (c)(1),
(2) Date: Apr. 26, 2017

(87) PCT Pub. No.: WO2017/067380
PCT Pub. Date: Apr. 27, 2017

(65) Prior Publication Data
US 2018/0232046 A1   Aug. 16, 2018

(30) Foreign Application Priority Data

Oct. 22, 2015 (CN) .......................... 2015 1 0691513

(51) Int. Cl.
*G06F 3/01* (2006.01)
*G06K 9/00* (2006.01)
*G06F 3/147* (2006.01)

(52) U.S. Cl.
CPC ................ *G06F 3/01* (2013.01); *G06F 3/147* (2013.01); *G06K 9/00369* (2013.01)

(58) Field of Classification Search
CPC ........ G06F 3/01; G06F 3/147; G06K 9/00369
See application file for complete search history.

(56) References Cited

U.S. PATENT DOCUMENTS

| | | | |
|---|---|---|---|
| 2006/0119572 A1* | 6/2006 | Lanier | G06F 1/1601 345/156 |
| 2012/0046144 A1* | 2/2012 | Lin | G06F 3/011 482/8 |

(Continued)

FOREIGN PATENT DOCUMENTS

| CN | 102053629 A | 5/2011 |
|---|---|---|
| CN | 102063887 A | 5/2011 |

(Continued)

OTHER PUBLICATIONS

First Office Action for Chinese Application No. 201510691513.6, dated Dec. 5, 2017, 6 Pages.

(Continued)

*Primary Examiner* — Muhammad N Edun
(74) *Attorney, Agent, or Firm* — Brooks Kushman P.C.

(57) ABSTRACT

A display device and an adjustment method thereof are provided. The display device includes a display panel, a base configured to support the display panel, a sensor fixedly arranged on a bezel of the display panel, a controller, and an execution member cooperating with the base. The controller is electrically connected to the sensor and the execution member. The sensor is configured to collect user state data in real time. The controller is configured to acquire the user state data collected by the sensor, analyze the user state data acquired within a predetermined time period, determine a current state of a user, generate a control instruction in accordance with the current state of the user, and send the control instruction to the execution member. The execution member is configured to drive the base to move in accordance with the control instruction.

20 Claims, 4 Drawing Sheets

(56) References Cited

U.S. PATENT DOCUMENTS

2016/0299574 A1    10/2016  Chen et al.
2017/0263215 A1     9/2017  Han et al.

FOREIGN PATENT DOCUMENTS

| CN | 201876734 U | 6/2011 |
| CN | 102927415 A | 2/2013 |
| CN | 202801617 U | 3/2013 |
| CN | 103075623 A | 5/2013 |
| CN | 103412620 A | 11/2013 |
| CN | 103699138 A | 4/2014 |
| CN | 104951768 A | 9/2015 |
| CN | 105117023 A | 12/2015 |
| CN | 105242787 A | 1/2016 |

OTHER PUBLICATIONS

International Search Report and Written Opinion for Application No. PCT/CN2016/100973, dated Dec. 27, 2016, 12 Pages.

\* cited by examiner

DISPLAY DEVICE AND ADJUSTMENT METHOD THEREOF

CROSS-REFERENCE TO RELATED APPLICATION APPLICATIONS

This application is the U.S. national phase of PCT Application No. PCT/CN2016/100973 filed on Sep. 30, 2016, which claims priority to Chinese Patent Application No. 201510691513.6 filed on Oct. 22, 2015, the disclosures of which are incorporated in their entirety by reference herein.

TECHNICAL FIELD

The present disclosure relates to the field of display technology, in particular to a display device and an adjustment method thereof.

BACKGROUND

Recently, along with the continuous development of office automation, such household display devices as personal computers and flat-panel computers have been widely used in our daily lives so as to learn and acquire information. These computers have become an indispensable part of our lives.

However, it is impossible for a display device of the computer available on the market to be automatically adjusted in such a manner as to enable a user to be in an optimum viewing arrange. Usually, the user needs to hold a posture for a long time period, so as to be adapted to an image displayed on the display device. Although the display devices for some desktop computers may be manually rotated forwardly and backwardly by a certain angle so as to be adapted to a user's sitting posture, it is difficult for the user to keep realizing when the sitting posture needs to be adjusted, and whether or not a distance between the display device and the user is optimum or whether or not the sitting posture is unhealthy. Hence, in the case that the distance between the display device and the user is inappropriate or the sitting posture is incorrect, the user may easily feel visual fatigue, and even the health of the user may be adversely affected.

SUMMARY

In one aspect, the present disclosure provides in some embodiments a display device, including a display panel, a base configured to support the display panel, a sensor fixedly arranged on a bezel of the display panel, a controller, and an execution member cooperating with the base. The controller is electrically connected to the sensor and the execution member. The sensor is configured to collect user state data in real time. The controller is configured to acquire the user state data collected by the sensor, analyze the user state data acquired within a predetermined time period, determine a current state of a user, generate a control instruction in accordance with the current state of the user, and send the control instruction to the execution member. The execution member is configured to drive the base to move in accordance with the control instruction, so as to adjust a distance between the display panel supported by the base and the user in accordance with the current state of the user.

In a possible embodiment of the present disclosure, the sensor is further configured to collect in real time data about distances between different body parts of the user and the display device as the user state data.

In a possible embodiment of the present disclosure, the controller is further configured to analyze the collected data about the distances between the different body parts of the user and the display device, and determine the current state of the user. The current state of the user includes one of a state where a user's sitting posture is normal and a distance between the user and the display device is appropriate, a state where the user's sitting posture is normal but the distance between the user and the display device is too small, a state where the user's sitting posture is normal but the distance between the user and the display device is too large, a state where the user leans forward and a state where the user leans backward.

In a possible embodiment of the present disclosure, in the case that an absolute value of a difference between the distances between the different body parts of the user and the display device analyzed by the controller is within a first threshold range and the distances between the different body parts of the user and the display device are within, smaller than and greater than a second threshold range respectively, the controller is further configured to determine the current states of the user as the state where the user's sitting posture is normal and the distance between the user and the display device is appropriate, the state where the user's sitting posture is normal but the distance between the user and the display device is too small, and the state where the user's sitting posture is normal but the distance between the user and the display device is too large respectively. In the case that the absolute value of the difference between the distances between the different body parts of the user and the display device analyzed by the controller is not within the first threshold range and a distance between an uppermost body part of the different body parts and the display device is smaller than a distance between a lowermost body part of the different body parts and the display device, the controller is further configured to determine the current state of the user to be the state where the user leans forward. In the case that the absolute value of the difference between the distances between the different body parts of the user and the display device analyzed by the controller is not within the first threshold range and the distance between the uppermost body part of the different body parts and the display device is greater than the distance between the lowermost body part of the different body parts and the display device, the controller is further configured to determine the current state of the user to be the state where the user leans backward.

In a possible embodiment of the present disclosure, the controller is further configured to: in the case that the current state of the user is the state where the user's sitting posture is normal and the distance between the user and the display device is appropriate, generate the control instruction for enabling the execution member to wait in place; in the case that the current state of the user is the state where the user's sitting posture is normal but the distance between the user and the display device is too small, generate the control instruction for enabling the execution member to drive the base to move in a direction away from the user, so as to enlarge the distance between the display panel supported by the base and the user; in the case that the current state of the user is the state where the user's sitting posture is normal but the distance between the user and the display device is too large, generate the control instruction for enabling the execution member to drive the base to move in a direction toward the user, so as to decrease the distance between the display panel supported by the base and the user; in the case that the current state of the user is the state where the user leans forward, generate the control instruction for enabling the execution member to drive the base to move in the direction toward the user, so as to decrease the distance between the display panel supported by the base and the user; and in the case that the current state of the user is the state where the user leans backward, generate the control instruction for enabling the execution member to drive the base to move in the direction away from the user, so as to enlarge the distance between the display panel supported by the base and the user.

In a possible embodiment of the present disclosure, the sensor is an image sensor or a sonic sensor.

In a possible embodiment of the present disclosure, the image sensor is a binocular or multi-lens camera.

In a possible embodiment of the present disclosure, the controller is one of a Central Processing Unit (CPU) or a Micro Controller Unit (MCU), or a circuit board or module including one of the CPU and the MCU.

In a possible embodiment of the present disclosure, the execution member includes a servo motor and a wheel fixedly arranged at a lower surface of the base and moved by the servo motor, or the execution member includes a servo motor and a guide rail assembly, and a part of the guide rail assembly is fixedly arranged at the lower surface of the base.

In a possible embodiment of the present disclosure, the uppermost body part of the different body parts is the head of the user and the lowermost body part of the different body parts is the chest of the user, or the uppermost body part of the different body parts is the chest of the user and the lowermost body part of the different body parts is the abdomen of the user.

In another aspect, the present disclosure provides in some embodiments a method for adjusting the above-mentioned display device, including steps of: collecting, by the sensor, user state data in real time; acquiring, by the controller, the user state data collected by the sensor, analyzing, by the controller, the user state data acquired within a predetermined time period, determining, by the controller, a current state of a user, generating, by the controller, a control instruction in accordance with the current state of the user, and sending, by the controller, the control instruction to the execution member; and driving, by the execution member, the base to move in accordance with the control instruction, so as to adjust a distance between the display panel supported by the base and the user in accordance with the current state of the user.

In a possible embodiment of the present disclosure, the step of collecting, by the sensor, the user state data in real time includes: collecting, by the sensor, in real time data about distances between different body parts of the user and the display device as the user state data.

In a possible embodiment of the present disclosure, the step of analyzing, by the controller, the user state data acquired within the predetermined time period and determining the current state of the user includes: analyzing, by the controller, the collected data about the distances between the different body parts of the user and the display device, and determining, by the controller, the current state of the user. The current state of the user includes one of a state where a user's sitting posture is normal and a distance between the user and the display device is appropriate, a state where the user's sitting posture is normal but the distance between the user and the display device is too small, a state where the user's sitting posture is normal but the distance between the user and the display device is too large, a state where the user leans forward and a state where the user leans backward.

In a possible embodiment of the present disclosure, the step of analyzing, by the controller, the user state data acquired within the predetermined time period and determining the current state of the user includes: in the case that an absolute value of a difference between the distances between the different body parts of the user and the display device analyzed by the controller is within a first threshold range and the distances between the different body parts of the user and the display device are within, smaller than and greater than a second threshold range respectively, determining, by the controller, the current states of the user to be the state where the user's sitting posture is normal and the distance between the user and the display device is appropriate, the state where the user's sitting posture is normal but the distance between the user and the display device is too small, and the state where the user's sitting posture is normal but the distance between the user and the display device is too large respectively; in the case that the absolute value of the difference between the distances between the different body parts of the user and the display device analyzed by the controller is not within the first threshold range and a distance between an uppermost body part of the different body parts and the display device is smaller than a distance between a lowermost body part of the different body parts and the display device, determining, by the controller, the current state of the user to be the state where the user leans forward; and in the case that the absolute value of the difference between the distances between the different body parts of the user and the display device analyzed by the controller is not within the first threshold range and the distance between the uppermost body part of the different body parts and the display device is greater than the distance between the lowermost body part of the different body parts and the display device, determining, by the controller, the current state of the user to be the state where the user leans backward.

In a possible embodiment of the present disclosure, the step of generating, by the controller, the control instruction in accordance with the current state of the user includes: in the case that the current state of the user is the state where the user's sitting posture is normal and the distance between the user and the display device is appropriate, generating, by the controller, the control instruction for enabling the execution member to wait in place; in the case that the current state of the user is the state where the user's sitting posture is normal but the distance between the user and the display device is too small, generating, by the controller, the control instruction for enabling the execution member to drive the base to move in a direction away from the user, so as to enable the distance between the display panel supported by the base and the user to be appropriate; in the case that the current state of the user is the state where the user's sitting posture is normal but the distance between the user and the display device is too large, generating, by the controller, the control instruction for enabling the execution member to drive the base to move in a direction toward the user, so as to decrease the distance between the display panel supported by the base and the user; in the case that the current state of the user is the state where the user leans forward, generating, by the controller, the control instruction for enabling the execution member to drive the base to move in the direction toward the user, so as to decrease the distance between the display panel supported by the base and the user; and in the case that the current state of the user is the state where the user leans backward, generating, by the controller, the control instruction for enabling the execution member to drive the base to move in the direction away from the user, so as to enlarge the distance between the display panel supported by the base and the user.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort. Shapes and sizes of the members in the drawings are for illustrative purposes only, but shall not be used to reflect any actual scale.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Figure 1:
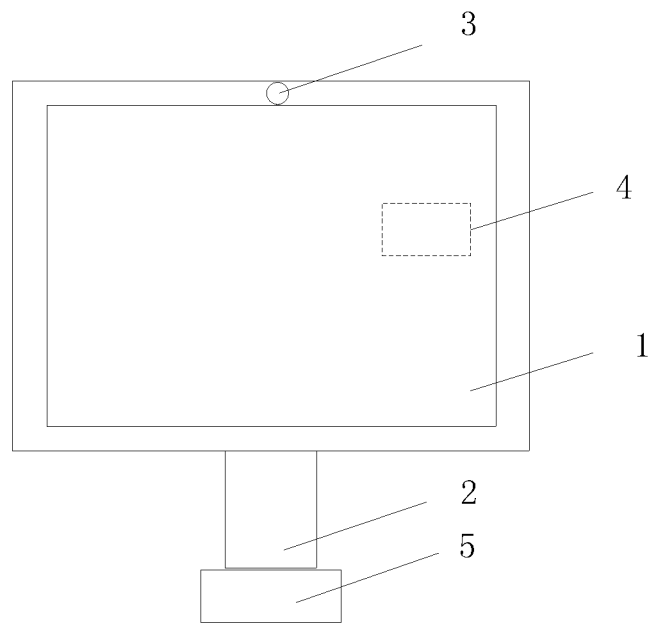
FIG. 1 is a schematic view showing a display device according to one embodiment of the present disclosure.
Figure 2:
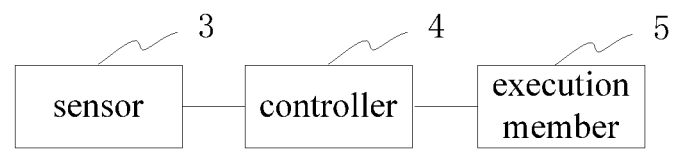
FIG. 2 is a schematic view showing a connection relationship among a controller, a sensor and an execution member according to one embodiment of the present disclosure.

The present disclosure provides in some embodiments a display device which, as shown in FIG. 1, includes a display panel 1, a base 2 configured to support the display panel, a sensor 3 fixedly arranged on a bezel of the display panel, a controller 4, and an execution member 5 cooperating with the base 2. It should be appreciated that, depending on the actual need or environment, the controller 4 may be arranged inside the display device, or arranged outside the display device separately. The controller 4 is electrically connected to the sensor 3 and the execution member 5, as shown in FIG. 2.

The functions of the elements of the display device will be further described hereinafter in conjunction with FIG. 1.

The sensor 3 is configured to collect in real time data about distances between different body parts of a user and the display device as user state data. It should be appreciated that, the different body parts of the user may include head, chest, shoulder, abdomen, and etc., and two or more of them may be selected as objects.

The controller 4 is configured to determine whether or not a user's sitting posture is correct, i.e., determine whether or not an absolute value in a difference between the distances between the different body parts of the user and the display device is within a first threshold range. In the case that the absolute value is within the first threshold range, the controller 4 determines that the user's sitting posture is correct, and in the case that the absolute value is within the first threshold range, the controller 4 determines that the user's sitting posture is incorrect.

In the case that the user's sitting posture is correct, the controller 4 may determine whether or not the distance between the user and the display device is appropriate. In the case that the distances between the different body parts of the user and the display device are within a second threshold range, the controller 4 may determine that the user's sitting posture is correct and the distance between the user and the display device is appropriate, and then generate a control instruction for enabling the display device to wait in place, and at this time, the display device may be held in place. In the case that the distances between the different body parts of the user and the display device are smaller than the second threshold range, the controller 4 may determine that the user's sitting posture is correct but the distance between the user and the display device is too small, and generate the control instruction for enabling the display device to move away from the user, and at this time, the execution member 5 may drive the base 2 to move the display panel 1 away from the user. In the case that the distances between the different body parts of the user and the display device are greater the second threshold range, the controller 4 may determine that the user's sitting posture is correct but the distance between the user and the display device is too large, and generate the control instruction for enabling the display device to move toward the user, and at this time, the execution member 5 may drive the base 2 to move away from the display panel 1.

In the case that the user's sitting posture is incorrect, the controller 4 may determine whether or not a distance between an uppermost body part among the different body parts of the user and the display device is smaller than a distance between a lowermost body part among the different body parts of the user and the display device. In the case that the distance between the uppermost body part of the different body parts and the display device is smaller than the distance between the lowermost body part of the different body parts and the display device, the controller 4 may determine that the user leans forward, and generate the control instruction for enabling the display device to move toward the user, and at this time, the execution member 5 may drive the base 2 to move the display panel 1 toward the user so as to prompt the user. In the case that the distance between the uppermost body part of the different body parts and the display device is greater than the distance between the lowermost body part of the different body parts and the display device, the controller 4 may determine that the user leans forward, and generate the control instruction for enabling the display device to move away from the user, and at this time, the execution member 5 may drive the base 2 to move the display panel 1 away from the user so as to prompt the user. After prompting the user of the sitting posture, the controller 4 may continue to determine whether or not the distance is appropriate in the case that the user's sitting posture is correct. It should be appreciated that, among the different body parts of the user, the uppermost body part is merely provided relative to the lowermost body part. For example, in the case that the user's head and chest are taken as the objects, the head is the uppermost body part, and the chest is the lowermost body part. For another example, in the case that the user's chest and abdomen are taken as the objects, the chest is the uppermost body part, and the abdomen is the lowermost body part.

Figure 3:
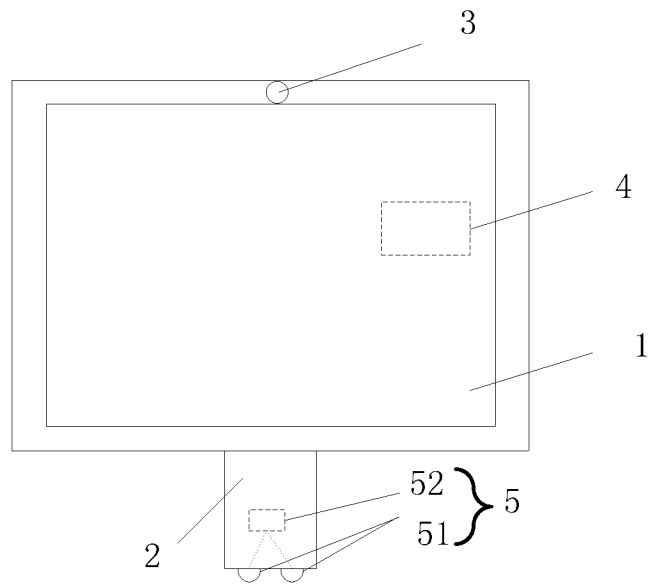
FIG. 3 is another schematic view showing the display device according to one embodiment of the present disclosure.
Figure 4:
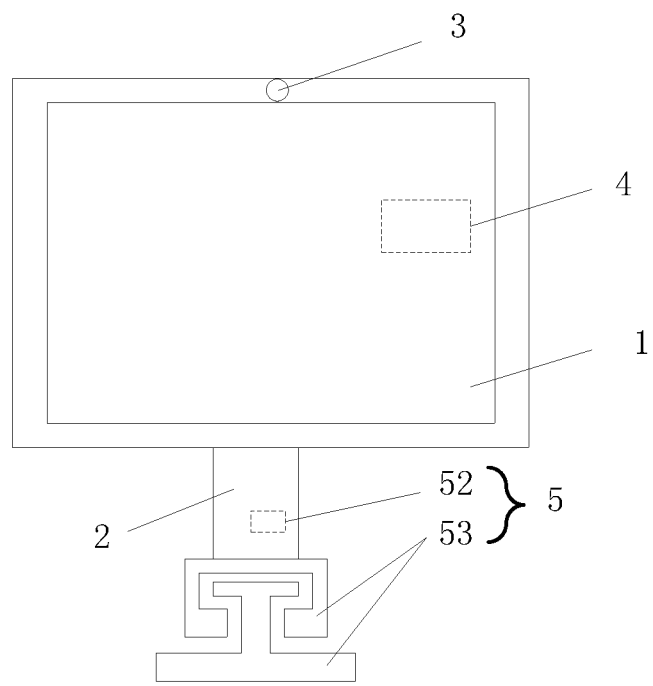
FIG. 4 is yet another schematic view showing the display device according to one embodiment of the present disclosure.

The execution member 5 may be any element capable of being controlled by the controller 4 and driving the display panel 1 to move. For example, as shown in FIG. 3, the execution member 5 may include a servo motor 52 and a wheel 51 fixed to the base 2 of the display device. Upon the reception of the control instruction from the controller 4, the servo motor 52 may drive the wheel 51 to rotate and thus drive the base 2 to move, so as to drive the display panel 1 to move. For another example, as shown in FIG. 4, the execution member 5 may include the servo motor 52 and a guide rail assembly 53. Usually, the guide rail assembly 53 includes two parts. One part of the guide rail assembly 53 is fixed to the base 2 and connected to a mechanical arm, a connection rod or the like. The other part of the guide rail assembly 53 is fixed onto a desk or wall. The servo motor 52 may drive the mechanical arm or connection rod to move, so that the one part of the guide rail assembly 53 may drive the base 2 to move on the other part of the guide rail assembly 53 so as to drive the display panel 1 to move. Of course, the execution member 5 is not limited to those mentioned above, and it may be of any other type, which will not be particularly defined herein.

The sensor 3 may be an image sensor, a sonic sensor, an infrared sensor, or any other sensor as long as it may be used to measure the distance between the user or the body part of the user and the display device. In a possible embodiment of the present disclosure, the image sensor may be a binocular or multi-lens camera, so as to detect the different body parts of the user simultaneously, thereby to improve the detection efficiency.

In a possible embodiment of the present disclosure, the controller 4 may be one of a CPU and a MCU, or a circuit board or module including one of the CPU and the MCU.

According to the embodiments of the present disclosure, through the sensor configured to collect the user state data, the controller configured to analyze the collected user state data and generate the control instruction, and the execution member configured to drive the display panel to move in accordance with the control instruction, it is able to, in the case that the user's sitting posture is incorrect, drive through the execution member the display panel to move toward or away from the user, thereby to prompt the user to adjust the sitting posture. After the adjustment of the sitting posture, in the case that the distance between the user and the display panel is inappropriate, the execution member may drive the base that supports the display panel to move, so as to hold the distance between the user and the display panel within an appropriate range. Through the cooperation of the sensor and the execution member, it is able for the display device to prompt the user to view an image within an optimum viewing range and with a correct sitting posture, thereby to prevent the occurrence of visual fatigue and prevent the health of the user from being adversely affected.

Figure 5:
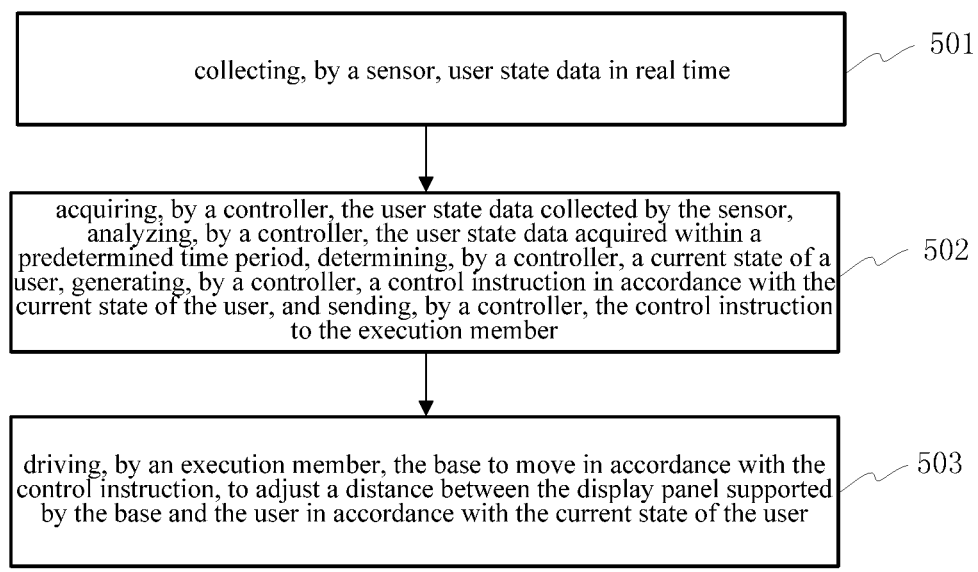
FIG. 5 is a flow chart of an adjustment method for the display device according to one embodiment of the present disclosure.

The present disclosure further provides in some embodiments an adjustment method for the above-mentioned display device which, as shown in FIG. 5, includes the following steps.

Step 501: collecting, by the sensor, user state data in real time. In this step, the sensor may collect in real time data about distances between different body parts of a user and the display device as user state data.

Step 502: acquiring, by the controller, the user state data collected by the sensor, analyzing, by the controller, the user state data acquired within a predetermined time period, determining, by the controller, a current state of a user, generating, by the controller, a control instruction in accordance with the current state of the user, and sending, by the controller, the control instruction to the execution member. In this step, the controller may analyze the collected data about the distances between the different body parts of the user and the display device, determine whether or not an absolute value of a difference between the distances between the different body parts and the display device is within a first threshold range so as to determine a user's sitting posture, and then determine whether or not the distances between the different body parts and the display device are within a second threshold range so as to determine where the distance between the user and the display device is appropriate.

In the case that the absolute value of the difference between the distances between the different body parts and the display device is within the first threshold range and the distances between the different body parts of the user and the display device are within the second threshold range, the controller may determine that the user's sitting posture is normal and the distance between the user and the display device is appropriate. In the case that the absolute value of the difference between the distances between the different body parts and the display device is within the first threshold range and the distances between the different body parts of the user and the display device are smaller than the second threshold range, the controller may determine that the user's sitting posture is normal but the distance between the user and the display device is too small. In the case that the absolute value of the difference between the distances between the different body parts and the display device is within the first threshold range and the distances between the different body parts of the user and the display device are greater than the second threshold range, the controller may determine that the user's sitting posture is normal but the distance between the user and the display device is too large.

In the case that the absolute value of the difference between the distances between the different body parts of the user and the display device is not within the first threshold range and a distance between an uppermost body part of the different body parts of the user and the display device is smaller than a distance between a lowermost body part and the display device, the controller may determine that the user leans forward. In the case that the distance between the uppermost body part and the display device is greater than the distance between the lowermost body part and the display device, the controller may determine that the user leans backward.

Step 503: driving, by the execution member, the base to move in accordance with the control instruction, so as to adjust a distance between the display panel supported by the base and the user in accordance with the current state of the user. In this step, in the case that the controller determines that the current state of the user is a state where the user's sitting posture is normal and the distance between the user and the display device is appropriate and generates the control instruction for enabling the execution member to wait in place, the execution member may be held in place.

In the Step 503, in the case that the controller determines that the current state of the user is a state where the user's sitting posture is normal but the distance between the user and the display device is too small and generates the control instruction for enabling the execution member to drive the base to move in a direction away from the user so as to provide an appropriate distance between the display panel supported by the base and the user, the execution member may drive the base to move in the direction away from the user; in the case that the controller determines that the current state of the user is a state where the user's sitting posture is normal but the distance between the user and the display device is too large, and generates the control instruction for enabling the execution member to drive the base to move in a direction toward the user so as to decrease the distance between the display panel supported by the base and the user, the execution member may drive the base to move in the direction toward the user; in the case that the controller determines that the current state of the user is a state where the user leans forward and generates the control instruction for enabling the execution member to drive the base to move in the direction toward the user so as to decrease the distance between the display panel supported by the base and the user, the execution member may drive the base to move in the direction toward the user; in the case that the controller determines that the current state of the user is a state where the user leans backward and generates the control instruction for enabling the execution member to drive the base to move in the direction away from the user so as to enlarge the distance between the display panel supported by the base and the user, the execution member may drive the base to move in the direction away from the user.

According to the embodiments of the present disclosure, through the sensor configured to collect the user state data, the controller configured to analyze the collected user state data and generate the control instruction, and the execution member configured to drive the display panel to move in accordance with the control instruction, it is able to, in the case that the user's sitting posture is incorrect, drive through the execution member the display panel to move toward or away from the user, thereby to prompt the user to adjust the sitting posture. After the adjustment of the sitting posture, in the case that the distance between the user and the display panel is inappropriate, the execution member may drive the base that supports the display panel to move, so as to hold the distance between the user and the display panel within an appropriate range. Through the cooperation of the sensor and the execution member, it is able for the display device to prompt the user to view an image within an optimum viewing range and with a correct sitting posture, thereby to prevent the occurrence of visual fatigue and prevent the health of the user from being adversely affected.

Figure 6:
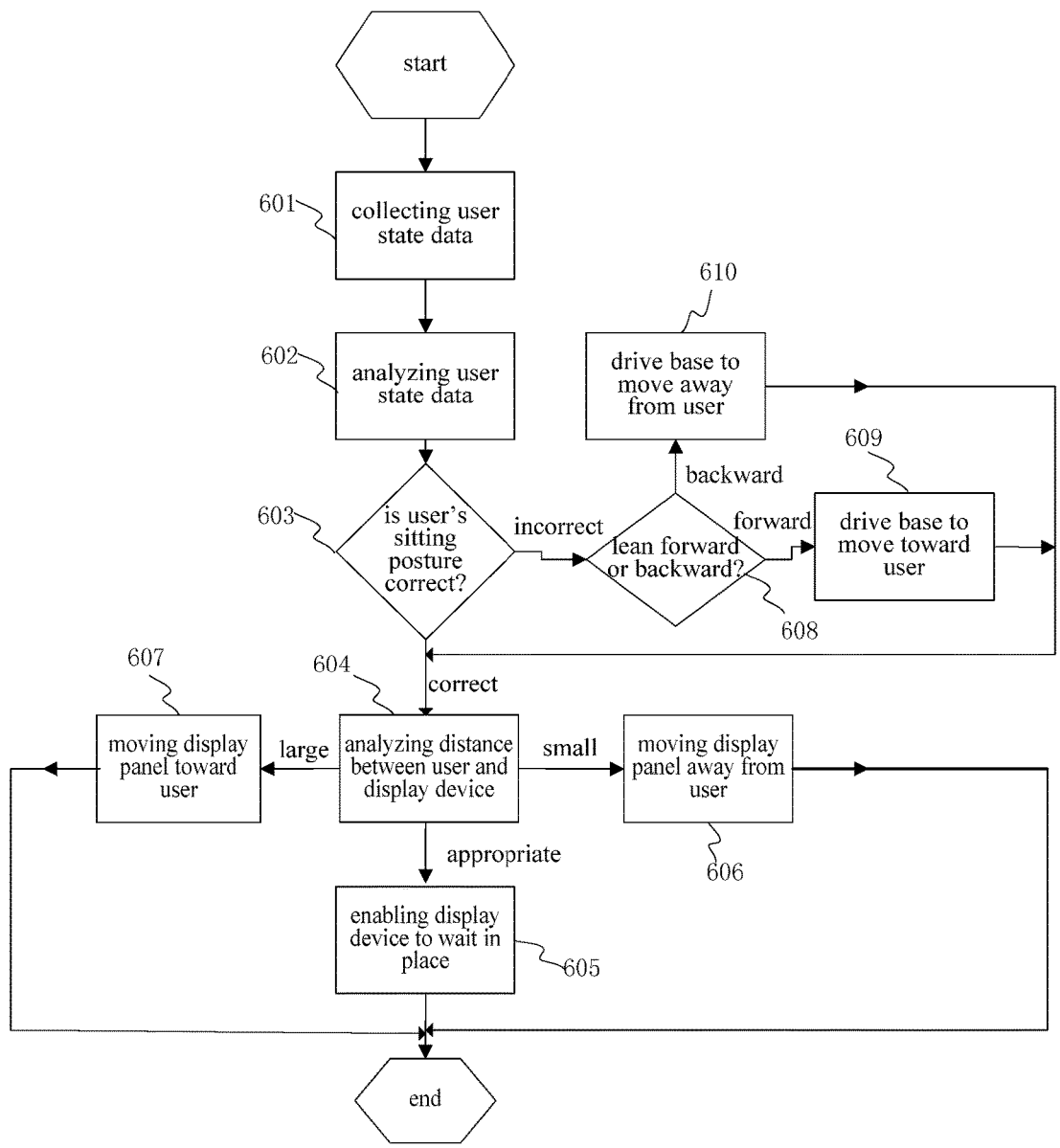
FIG. 6 is another flow chart of the adjustment method for the display device according to one embodiment of the present disclosure.

The present disclosure further provides in some embodiments an adjustment method for the display device which, as shown in FIG. 6, includes the following steps.

Step 601 of collecting, by the sensor, in real time data about distances between different body parts of a user and the display device as user state data.

Step 602 of analyzing, by the controller, the collected data about the distances between the different body parts of the user and the display device.

Step 603 of determining, by the controller, whether or not the user's sitting posture is correct in accordance with whether or not an absolute value of a difference between the distances between the different body parts of the user and the display device is within a first threshold range, in the case that the absolute value is within the first threshold range, determining that the user's sitting posture is correct and proceeding to Step 604, and in the case that the absolute value is not within the first threshold range, determining that the user's sitting posture is incorrect and proceeding to Step 608.

Step 604 of determining, by the controller, whether or the distance between the user and the display device is appropriate, in the case that the distances between the different body parts of the user and the display device are within a second threshold range, determining that the user's sitting posture is correct and the distance between the user and the display device is appropriate and proceeding to Step 605, in the case that the distances between the different body parts of the user and the display device are smaller than the second threshold range, determining that the user's sitting posture is normal but the distance between the user and the display device is too small and proceeding to Step 606, and in the case that the distances between the different body parts of the user and the display device are greater than the second threshold range, determining that the user's sitting posture is normal but the distance between the user and the display device is too large and proceeding to Step 607.

Step 605 of, in the case that the current state of the user is a state where the user's sitting posture is normal and the distance between the user and the display device is appropriate, generating, by the controller, a control instruction for enabling the execution member to wait in place, so as to enable the execution member to be held in place.

Step 606 of, in the case that the current state of the user is a state where the user's sitting posture is normal but the distance between the user and the display device is too small, generating, by the controller, the control instruction for enabling the execution member to drive the base to move in a direction away from the user, so as to enable the execution member to drive the base to move the display panel away from the user.

Step 607 of, in the case that the current state of the user is a state where the user's sitting posture is normal but the distance between the user and the display device is too large, generating, by the controller, the control instruction for enabling the execution member to drive the base to move in a direction toward the user, so as to enable the execution member to drive the base to move the display panel toward the user.

Step 608 of determining, by the controller, whether the user leans forward or backward in accordance with a distance between an uppermost body part of the different body parts of the user and the display device as well as a distance between a lowermost body part of the different body parts of the user and the display device, in the case that the distance between the uppermost body part and the display device is smaller than the distance between the lowermost body part and the display device, determining that the current state of the user is the state where the user leans forward and proceeding to Step 609, and in the case that the distance between the uppermost body part and the display device is greater than the distance between the lowermost body part and the display device, determining that the current state of the user is the state where the user leans backward and proceeding to Step 610;

Step 609 of, in the case that the current state of the user is the state where the user leans forward, generating, by the controller, the control instruction for enabling the execution member to drive the base to move in the direction toward the user, so as to enable the execution member to decrease the distance between the display panel supported by the base and the user and prompt the user, and then returning to Step 604 so as to determine whether or not the distance between the user and the display device is appropriate.

Step 610 of, in the case that the current state of the user is a state where the user leans backward, generating, by the controller, the control instruction for enabling the execution member to drive the base to move in the direction away from the user, so as to enable the execution member to enlarge the distance between the display panel supported by the base and the user and prompt the user, and then returning to Step 604 so as to determine whether or not the distance between the user and the display device is appropriate.

For ease of understanding, the distances between the different body parts and the display device, the first threshold range and the second threshold range will be described illustratively hereinafter. For example, in the case that the head is the uppermost body part and the chest is the lowermost body part, the first threshold range may be 0 to 5 cm, and the second threshold range may be 50 to 70 cm.

For example, in the case that the distance between the head and the display device is 55 cm and the distance between the chest and the display device is 58 cm, the controller may determine whether or not the user's sitting posture is correct at first. At this time, the absolute value of the difference between the distance between the head and the display device and the distance between the chest and the display device is 3, i.e., within the first threshold range, so the controller may determine that the user's sitting posture is correct. Then, the controller may determine whether or not the distance between the user and the display device is appropriate. At this time, the distance between the head and the display device is 55 cm, and the distance between the chest and the display device is 58 cm, so the distance between the head and the display device and the distance between the chest and the display device are within the second threshold range, so the controller may determine that the user's sitting posture is correct and the distance between the user and the display device is appropriate, and the display device may be held in place.

For example, in the case that the distance between the head and the display device is 45 cm and the distance between the chest and the display device is 48 cm, the controller may determine whether or not the user's sitting posture is correct at first. At this time, the absolute value of the difference between the distance between the head and the display device and the distance between the chest and the display device is 3, i.e., within the first threshold range, so the controller may determine that the user's sitting posture is correct. Then, the controller may determine whether or not the distance between the user and the display device is appropriate. At this time, the distance between the head and the display device is 45 cm, and the distance between the chest and the display device is 48 cm, the distance between the head and the display device as well as the distance between the chest and the display device are smaller than the second threshold range, so the controller may determine that the user's sitting posture is correct but the distance between the user and the display device is too small, and the display device needs to move away from the user.

For example, in the case that the distance between the head and the display device is 85 cm and the distance between the chest and the display device is 88 cm, the controller may determine whether or not the user's sitting posture is correct at first. At this time, the absolute value between the difference between the distance between the head and the display device and the distance between the chest and the display device is 3, i.e., within the first threshold range, so the controller may determine that the user's sitting posture is correct. Then, the controller may determine whether or not the distance between the user and the display device is appropriate. At this time, the distance between the head and the display device is 85 cm, and the distance between the chest and the display device is 88 cm, the distance between the head and the display device and the distance between the chest and the display device are greater than the second threshold range, so the controller may determine that the user's sitting posture is correct but the distance between the user and the display device is too large, and the display device needs to move toward the user.

For example, in the case that the distance between the head and the display device is 55 cm and the distance between the chest and the display device is 65, the controller may determine whether or not the user's sitting posture is correct at first. At this time, the absolute value of the difference between the distance between the head and the display device and the distance between the chest and the display device is 10, i.e., not within the first threshold range, so the controller may determine that the user's sitting posture is incorrect. Then, the controller may further determine whether or not the distance between the head and the display is smaller than the distance between the chest and the display device. At this time, the distance between the head and the display device is smaller than the distance between the chest and the display device, so the controller may determine that the user leans forward and but the distance between the user and the display device is too small, and then prompt the user to adjust the sitting posture.

For example, in the case that the distance between the head and the display device is 55 cm and the distance between the chest and the display device is 45, the controller may determine whether or not the user's sitting posture is correct at first. At this time, the absolute value of the difference between the distance between the head and the display device and the distance between the chest and the display device is 10, i.e., not within the first threshold range, so the controller may determine that the user's sitting posture is incorrect. Then, the controller may further determine whether or not the distance between the head and the display device is smaller than the distance between the chest and the display device. At this time, the distance between the head and the display device is greater than the distance between the chest and the display device, so the controller may determine that the user leans backward and the display device needs to move away from the user, and the controller may prompt the user to adjust the sitting posture.

It should be appreciated that, the above descriptions about the distances between the different body parts and the display device, the first threshold range and the second threshold range are for illustrative purposes only, but shall not be used to limit the scope of the present disclosure. For example, the first threshold range may also be 0-1 cm, 0-2 cm, 0-3 cm or the like, and the second threshold range may also be 50-80 cm, 40-60 cm, 50-80 cm or the like, which are not particularly defined herein.

The first threshold range is used to determine whether or not an upper body part and an intermediate body part of the user is in a line, thereby to determine whether or not the user's sitting posture is correct. The second threshold range is used to determine whether or not the distance between the user and the display device is appropriate for viewing an image displayed on the display panel.

According to the embodiments of the present disclosure, through the sensor configured to collect the user state data, the controller configured to analyze the collected user state data and generate the control instruction, and the execution member configured to drive the display panel to move in accordance with the control instruction, it is able to, in the case that the user's sitting posture is incorrect, drive through the execution member the display panel to move toward or away from the user, thereby to prompt the user to adjust the sitting posture. After the adjustment of the sitting posture, in the case that the distance between the user and the display panel is inappropriate, the execution member may drive the base that supports the display panel to move, so as to hold the distance between the user and the display panel within an appropriate range. Through the cooperation of the sensor and the execution member, it is able for the display device to prompt the user to view an image within an optimum viewing range and with a correct sitting posture, thereby to prevent the occurrence of visual fatigue and prevent the health of the user from being adversely affected.

The above are merely the preferred embodiments of the present disclosure. Obviously, a person skilled in the art may make further modifications and improvements without departing from the spirit of the present disclosure, and these modifications and improvements shall also fall within the scope of the present disclosure.

What is claimed is:

1. A display device, comprising:
a display panel;
a base configured to support the display panel;
a sensor fixedly arranged on a bezel of the display panel;
a controller; and
an execution member cooperating with the base,
wherein the sensor is configured to collect user state data in real time;
the controller is electrically connected to the sensor and the execution member, and configured to acquire the user state data collected by the sensor, analyze the user state data acquired within a predetermined time period, determine a current state of a user, generate a control instruction in accordance with the current state of the user, and send the control instruction to the execution member; and
the execution member is configured to drive the base to move in accordance with the control instruction, to adjust a distance between the display panel supported by the base and the user in accordance with the current state of the user,
wherein the execution member comprises a servo motor and a wheel, and the wheel is fixedly arranged at a lower surface of the base and capable of being moved by the servo motor; or
the execution member comprises a servo motor and a guide rail assembly, and a part of the guide rail assembly is fixedly arranged at the lower surface of the base.

2. The display device according to claim 1, wherein the sensor is configured to collect in real time data about distances between different body parts of the user and the display device as the user state data.

3. The display device according to claim 2, wherein
the controller is further configured to analyze the collected data about the distances between the different body parts of the user and the display device, and determine the current state of the user; and
the current state of the user comprises one of following states: a state where a user's sitting posture is normal and a distance between the user and the display device is appropriate, a state where the user's sitting posture is normal but the distance between the user and the display device is too small, a state where the user's sitting posture is normal but the distance between the user and the display device is too large, a state where the user leans forward and a state where the user leans backward.

4. The display device according to claim 3, wherein
in the case that an absolute value of a difference between the distances between the different body parts of the user and the display device analyzed by the controller is within a first threshold range and the distances between the different body parts of the user and the display device are within, smaller than and greater than a second threshold range respectively, the controller determines the current states of the user to be the state where the user's sitting posture is normal and the distance between the user and the display device is appropriate, the state where the user's sitting posture is normal but the distance between the user and the display device is too small, and the state where the user's sitting posture is normal but the distance between the user and the display device is too large respectively;
in the case that the absolute value of the difference between the distances between the different body parts of the user and the display device analyzed by the controller is not within the first threshold range and a distance between an uppermost body part of the different body parts and the display device is smaller than a distance between a lowermost body part of the different body parts and the display device, the controller determines the current state of the user to be the state where the user leans forward; and
in the case that the absolute value of the difference between the distances between the different body parts of the user and the display device analyzed by the controller is not within the first threshold range and the distance between the uppermost body part of the different body parts and the display device is greater than the distance between the lowermost body part of the different body parts and the display device, the controller determines the current state of the user to be the state where the user leans backward.

5. The display device according to claim 4, wherein
the uppermost body part of the different body parts is the head of the user, and the lowermost body part of the different body parts is the chest of the user; or
the uppermost body part of the different body parts is the chest of the user, and the lowermost body part of the different body parts is the abdomen of the user.

6. The display device according to claim 3, wherein the controller is further configured to:
in the case that the current state of the user is the state where the user's sitting posture is normal and the distance between the user and the display device is appropriate, generate the control instruction for enabling the execution member to wait in place;

in the case that the current state of the user is the state where the user's sitting posture is normal but the distance between the user and the display device is too small, generate the control instruction for enabling the execution member to drive the base to move in a direction away from the user, to enlarge the distance between the display panel supported by the base and the user;

in the case that the current state of the user is the state where the user's sitting posture is normal but the distance between the user and the display device is too large, generate the control instruction for enabling the execution member to drive the base to move in a direction toward the user, to decrease the distance between the display panel supported by the base and the user;

in the case that the current state of the user is the state where the user leans forward, generate the control instruction for enabling the execution member to drive the base to move in the direction toward the user, to decrease the distance between the display panel supported by the base and the user; and in the case that the current state of the user is the state where the user leans backward, generate the control instruction for enabling the execution member to drive the base to move in the direction away from the user, to enlarge the distance between the display panel supported by the base and the user.

7. The display device according to claim 2, wherein the sensor is an image sensor, a sonic sensor or an infrared sensor.

8. The display device according to claim 7, wherein the image sensor is a binocular or multi-lens camera.

9. The display device according to claim 2, wherein the controller is one of a CPU and a MCU, or a circuit board or a module comprising one of the CPU and the MCU.

10. The display device according to claim 1, wherein the sensor is an image sensor, a sonic sensor or an infrared sensor.

11. The display device according to claim 10, wherein the image sensor is a binocular or multi-lens camera.

12. The display device according to claim 1, wherein the controller is one of a Central Processing Unit CPU and a Micro Controller Unit MCU, or a circuit board or a module comprising one of the CPU and the MCU.

13. A method for adjusting the display device according to claim 1, comprising:

collecting, by the sensor, the user state data in real time;

acquiring, by the controller, the user state data collected by the sensor, analyzing, by the controller, the user state data acquired within the predetermined time period, determining, by the controller, the current state of the user, generating, by the controller, the control instruction in accordance with the current state of the user, and sending, by the controller, the control instruction to the execution member; and driving, by the execution member, the base to move in accordance with the control instruction, to adjust the distance between the display panel supported by the base and the user in accordance with the current state of the user.

14. The method according to claim 13, wherein collecting by the sensor the user state data in real time comprises:

collecting, by the sensor, in real time data about distances between different body parts of the user and the display device as the user state data.

15. The method according to claim 14, wherein analyzing by the controller the user state data acquired within the predetermined time period and determining by the controller the current state of the user comprises:

analyzing, by the controller, the collected data about the distances between the different body parts of the user and the display device, and determining, by the controller, the current state of the user, wherein the current state of the user comprises: one of a state where a user's sitting posture is normal and a distance between the user and the display device is appropriate, a state where the user's sitting posture is normal but the distance between the user and the display device is too small, a state where the user's sitting posture is normal but the distance between the user and the display device is too large, a state where the user leans forward and a state where the user leans backward.

16. The method according to claim 15, wherein analyzing by the controller the user state data acquired within the predetermined time period and determining by the controller the current state of the user comprises:

in the case that an absolute value of a difference between the distances between the different body parts of the user and the display device analyzed by the controller is within a first threshold range and the distances between the different body parts of the user and the display device are within, smaller than and greater than a second threshold range respectively, determining, by the controller, the current states of the user to be the state where the user's sitting posture is normal and the distance between the user and the display device is appropriate, the state where the user's sitting posture is normal but the distance between the user and the display device is too small, and the state where the user's sitting posture is normal but the distance between the user and the display device is too large respectively;

in the case that the absolute value of the difference between the distances between the different body parts of the user and the display device analyzed by the controller is not within the first threshold range and a distance between an uppermost body part of the different body parts and the display device is smaller than a distance between a lowermost body part of the different body parts and the display device, determining, by the controller, the current state of the user to be the state where the user leans forward; and in the case that the absolute value of the difference between the distances between the different body parts of the user and the display device analyzed by the controller is not within the first threshold range and the distance between the uppermost body part of the different body parts and the display device is greater than the distance between the lowermost body part of the different body parts and the display device, determining, by the controller, the current state of the user to be the state where the user leans backward.

17. The method according to claim 16, wherein the uppermost body part of the different body parts is the head of the user, and the lowermost body part of the different body parts is the chest of the user, or the uppermost body part of the different body parts is the chest of the user, and the lowermost body part of the different body parts is the abdomen of the user.

18. The method according to claim 15, wherein generating by the controller the control instruction in accordance with the current state of the user comprises:
- in the case that the current state of the user is the state where the user's sitting posture is normal and the distance between the user and the display device is appropriate, generating, by the controller, the control instruction for enabling the execution member to wait in place;
- in the case that the current state of the user is the state where the user's sitting posture is normal but the distance between the user and the display device is too small, generating, by the controller, the control instruction for enabling the execution member to drive the base to move in a direction away from the user, to enlarge the distance between the display panel supported by the base and the user;
- in the case that the current state of the user is the state where the user's sitting posture is normal but the distance between the user and the display device is too large, generating, by the controller, the control instruction for enabling the execution member to drive the base to move in a direction toward the user, to decrease the distance between the display panel supported by the base and the user;
- in the case that the current state of the user is the state where the user leans forward, generating, by the controller, the control instruction for enabling the execution member to drive the base to move in the direction toward the user, to decrease the distance between the display panel supported by the base and the user; and
- in the case that the current state of the user is the state where the user leans backward, generating, by the controller, the control instruction for enabling the execution member to drive the base to move in the direction away from the user, to enlarge the distance between the display panel supported by the base and the user.

19. A display device, comprising:
a display panel;
a base configured to support the display panel;
a sensor fixedly arranged on a bezel of the display panel;
a controller; and
an execution member cooperating with the base,
wherein the sensor is configured to collect user state data in real time;
the controller is electrically connected to the sensor and the execution member, and configured to acquire the user state data collected by the sensor, analyze the user state data acquired within a predetermined time period, determine a current state of a user, generate a control instruction in accordance with the current state of the user, and send the control instruction to the execution member;
the execution member is configured to drive the base to move in accordance with the control instruction, to adjust a distance between the display panel supported by the base and the user in accordance with the current state of the user;
the sensor is configured to collect in real time data about distances between different body parts of the user and the display device as the user state data;
the controller is further configured to analyze the collected data about the distances between the different body parts of the user and the display device, and determine the current state of the user;
the current state of the user comprises one of following states: a state where a user's sitting posture is normal and a distance between the user and the display device is appropriate, a state where the user's sitting posture is normal but the distance between the user and the display device is too small, a state where the user's sitting posture is normal but the distance between the user and the display device is too large, a state where the user leans forward and a state where the user leans backward;
in the case that an absolute value of a difference between the distances between the different body parts of the user and the display device analyzed by the controller is within a first threshold range and the distances between the different body parts of the user and the display device are within, smaller than and greater than a second threshold range respectively, the controller determines the current states of the user to be the state where the user's sitting posture is normal and the distance between the user and the display device is appropriate, the state where the user's sitting posture is normal but the distance between the user and the display device is too small, and the state where the user's sitting posture is normal but the distance between the user and the display device is too large respectively;
in the case that the absolute value of the difference between the distances between the different body parts of the user and the display device analyzed by the controller is not within the first threshold range and a distance between an uppermost body part of the different body parts and the display device is smaller than a distance between a lowermost body part of the different body parts and the display device, the controller determines the current state of the user to be the state where the user leans forward; and
in the case that the absolute value of the difference between the distances between the different body parts of the user and the display device analyzed by the controller is not within the first threshold range and the distance between the uppermost body part of the different body parts and the display device is greater than the distance between the lowermost body part of the different body parts and the display device, the controller determines the current state of the user to be the state where the user leans backward.

20. A display device, comprising:
a display panel;
a base configured to support the display panel;
a sensor fixedly arranged on a bezel of the display panel;
a controller; and
an execution member cooperating with the base,
wherein the sensor is configured to collect user state data in real time;
the controller is electrically connected to the sensor and the execution member, and configured to acquire the user state data collected by the sensor, analyze the user state data acquired within a predetermined time period, determine a current state of a user, generate a control instruction in accordance with the current state of the user, and send the control instruction to the execution member;
the execution member is configured to drive the base to move in accordance with the control instruction, to adjust a distance between the display panel supported by the base and the user in accordance with the current state of the user;

the sensor is configured to collect in real time data about distances between different body parts of the user and the display device as the user state data;

the controller is further configured to analyze the collected data about the distances between the different body parts of the user and the display device, and determine the current state of the user; and the current state of the user comprises one of following states: a state where a user's sitting posture is normal and a distance between the user and the display device is appropriate, a state where the user's sitting posture is normal but the distance between the user and the display device is too small, a state where the user's sitting posture is normal but the distance between the user and the display device is too large, a state where the user leans forward and a state where the user leans backward, wherein the controller is further configured to:

in the case that the current state of the user is the state where the user's sitting posture is normal and the distance between the user and the display device is appropriate, generate the control instruction for enabling the execution member to wait in place;

in the case that the current state of the user is the state where the user's sitting posture is normal but the distance between the user and the display device is too small, generate the control instruction for enabling the execution member to drive the base to move in a direction away from the user, to enlarge the distance between the display panel supported by the base and the user;

in the case that the current state of the user is the state where the user's sitting posture is normal but the distance between the user and the display device is too large, generate the control instruction for enabling the execution member to drive the base to move in a direction toward the user, to decrease the distance between the display panel supported by the base and the user;

in the case that the current state of the user is the state where the user leans forward, generate the control instruction for enabling the execution member to drive the base to move in the direction toward the user, to decrease the distance between the display panel supported by the base and the user; and in the case that the current state of the user is the state where the user leans backward, generate the control instruction for enabling the execution member to drive the base to move in the direction away from the user, to enlarge the distance between the display panel supported by the base and the user.

* * * * *